(12) United States Patent
Shimizu et al.

(10) Patent No.: US 10,827,031 B2
(45) Date of Patent: Nov. 3, 2020

(54) COMMUNICATIONS SYSTEM, PROCESSING SERVER, AND BEARER ESTABLISHMENT CONTROL METHOD

(71) Applicant: NTT DOCOMO, INC., Tokyo (JP)

(72) Inventors: Masayoshi Shimizu, Tokyo (JP); Atsushi Minokuchi, Tokyo (JP); Takuya Shimojou, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 20 days.

(21) Appl. No.: 16/325,316

(22) PCT Filed: Jul. 6, 2017

(86) PCT No.: PCT/JP2017/024842
§ 371 (c)(1),
(2) Date: Feb. 13, 2019

(87) PCT Pub. No.: WO2018/034078
PCT Pub. Date: Feb. 22, 2018

(65) Prior Publication Data
US 2019/0199826 A1   Jun. 27, 2019

(30) Foreign Application Priority Data
Aug. 15, 2016  (JP) ................. 2016-159201

(51) Int. Cl.
*H04L 29/08* (2006.01)
*H04W 92/04* (2009.01)
(Continued)

(52) U.S. Cl.
CPC ............ *H04L 67/325* (2013.01); *H04L 5/008* (2013.01); *H04W 28/0252* (2013.01);
(Continued)

(58) Field of Classification Search
CPC ..................................................... H04L 67/325
(Continued)

(56) References Cited

U.S. PATENT DOCUMENTS

2006/0182059 A1\* 8/2006 Itaba ................... H04W 76/12
370/329
2011/0305166 A1\* 12/2011 Ootani ................. H04W 48/20
370/254
(Continued)

FOREIGN PATENT DOCUMENTS

JP          2012-175575 A       9/2012

OTHER PUBLICATIONS

Written Opinion of the International Searching Authority issued in PCT/JP2017/024842 dated Sep. 19, 2017 (5 pages).
(Continued)

*Primary Examiner* — Peter G Solinsky
(74) *Attorney, Agent, or Firm* — Osha Liang LLP

(57) ABSTRACT

In a communication system (1) including a terminal (10), a base station (20), a processing server (30) that executes a process related to the terminal, and one or a plurality of serving gateways (40), the processing server (30) includes: a determination unit (31) that determines whether or not an unused bearer other than a used bearer used for a service process is to be established on the basis of a system load for bearer maintenance and a system load for bearer establishment when the determination unit receives a service processing request from the terminal that is in an idle state; and a bearer establishment control unit (32) that performs control so that the unused bearer determined to be established by the determination unit (31) and the used bearer are established between a corresponding serving gateway and the terminal.

3 Claims, 7 Drawing Sheets

(51) Int. Cl.
  *H04W 72/04* (2009.01)
  *H04L 5/00* (2006.01)
  *H04W 28/02* (2009.01)
  *H04W 52/02* (2009.01)
(52) U.S. Cl.
  CPC ....... *H04W 52/0216* (2013.01); *H04W 72/04* (2013.01); *H04W 92/04* (2013.01); *H04W 72/0446* (2013.01)
(58) Field of Classification Search
  USPC .......................................................... 370/230
  See application file for complete search history.

(56) References Cited

U.S. PATENT DOCUMENTS

| | | | | |
|---|---|---|---|---|
| 2012/0149386 A1* | 6/2012 | Kumar | ................. | H04W 76/10 455/452.2 |
| 2014/0022904 A1* | 1/2014 | Ahmad | ............. | H04W 28/0215 370/235 |

OTHER PUBLICATIONS

International Preliminary Report on Patentability from PCT/JP2017/024842 dated Feb. 28, 2019 (2 pages).
Extended European Search Report in counterpart European Application No. 17841306.8 dated Feb. 20, 2020 (7 pages).
Office Action issued in European Application No. 17841306.8, dated Sep. 10, 2020 (5 pages).

* cited by examiner

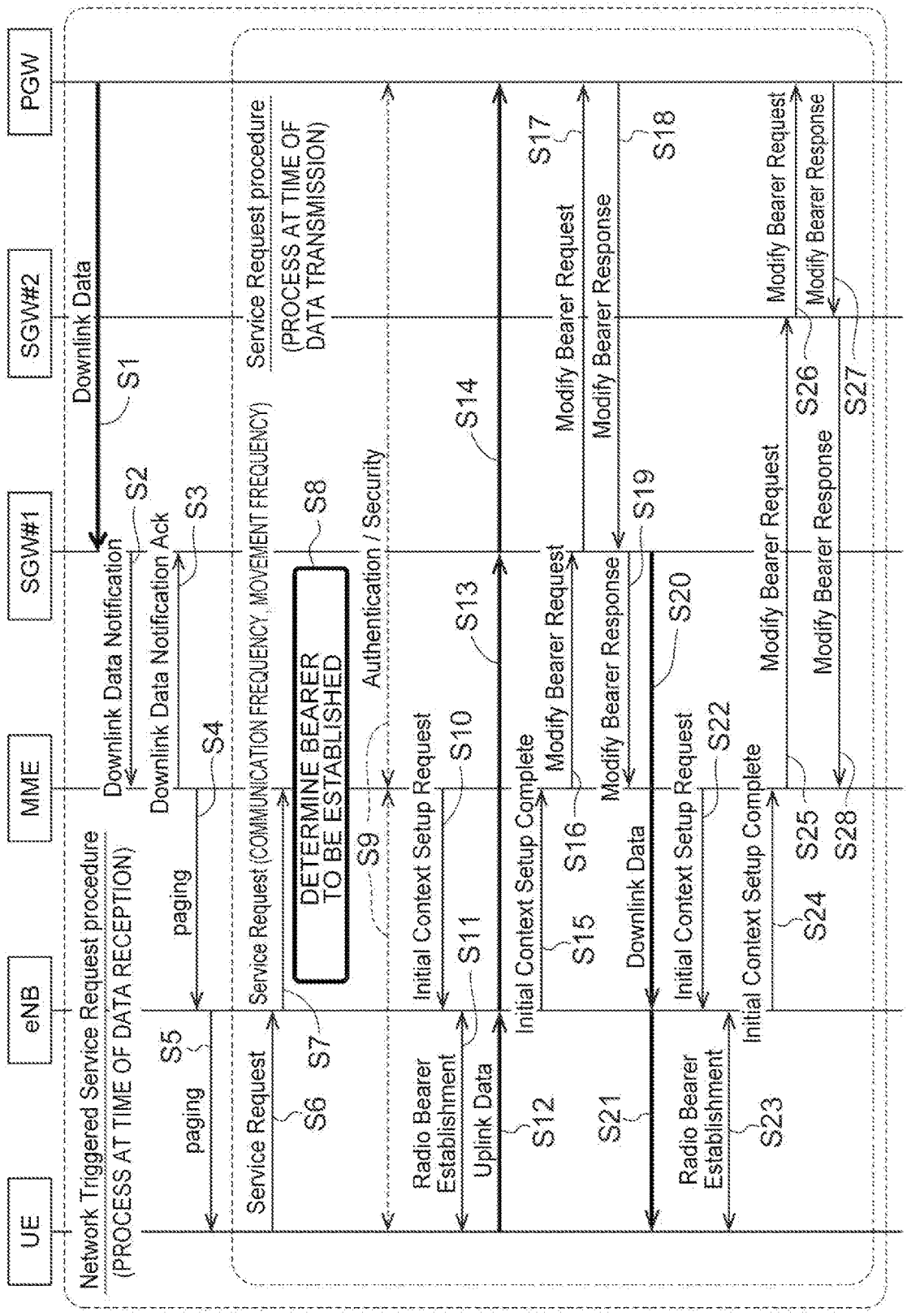

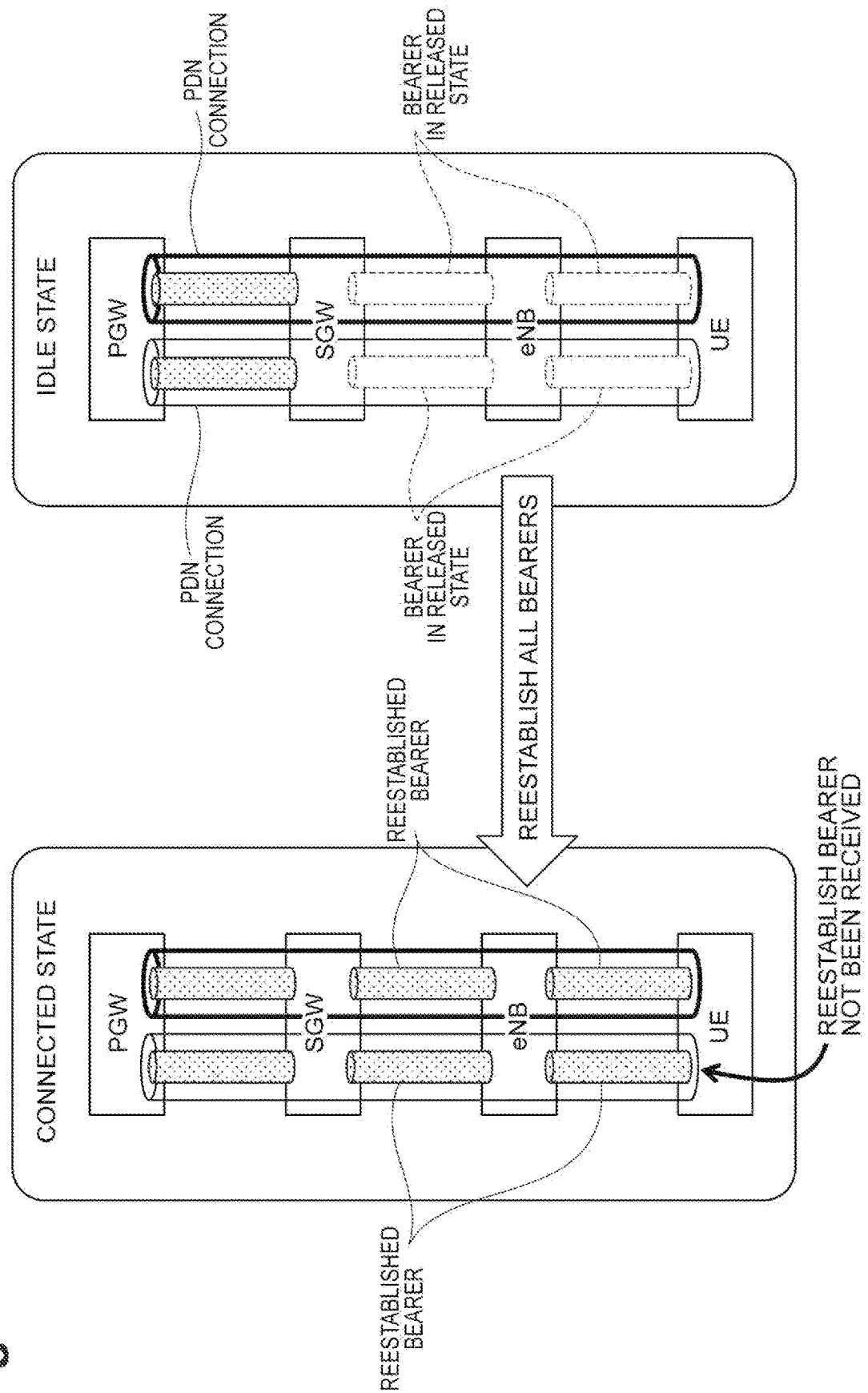

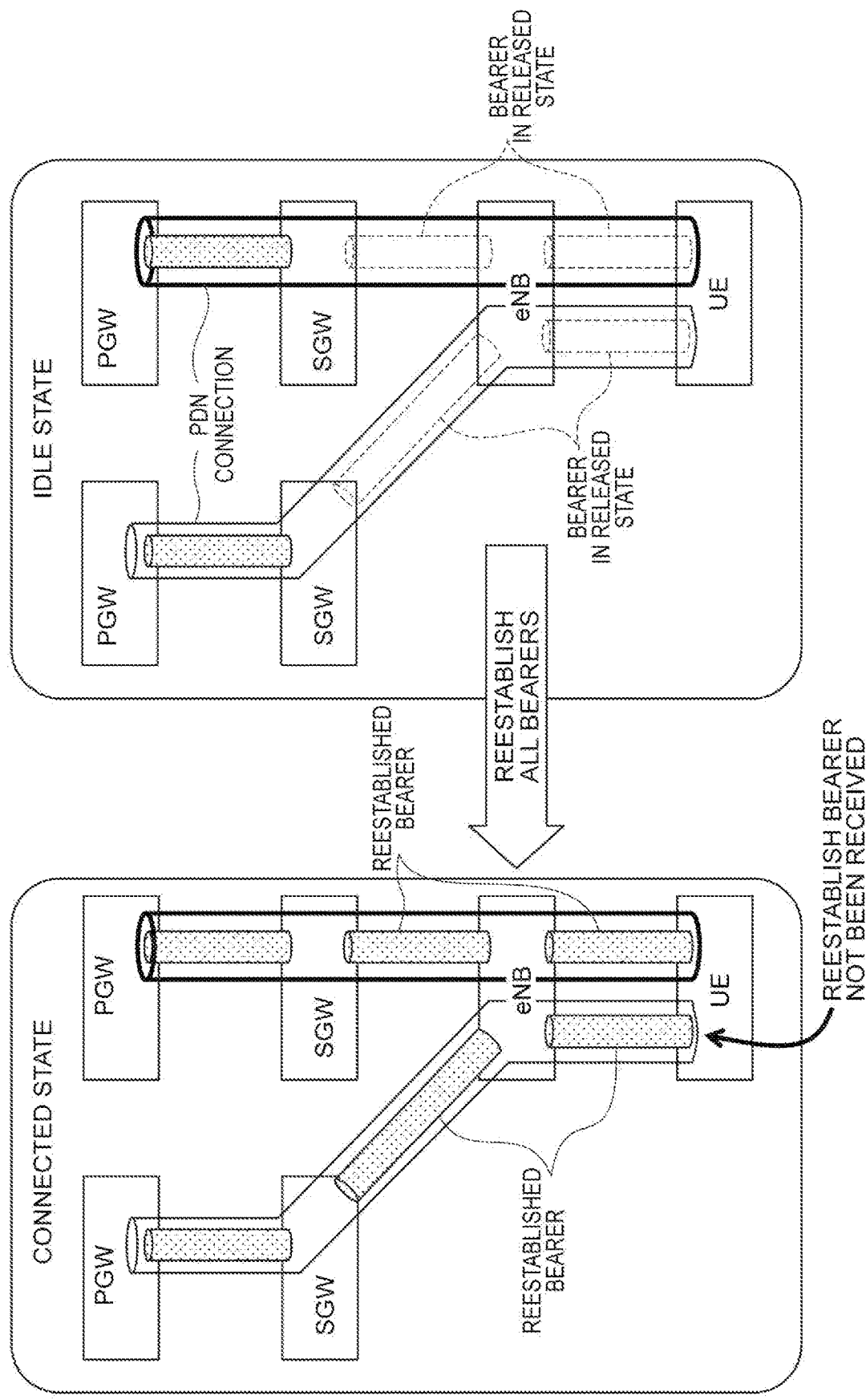

COMMUNICATIONS SYSTEM, PROCESSING SERVER, AND BEARER ESTABLISHMENT CONTROL METHOD

TECHNICAL FIELD

The present invention relates to a communication system, a processing server, and a bearer establishment control method, which performs control regarding establishment of a path (so-called bearer) of a user data packet between a terminal and a serving gateway (hereinafter sometimes abbreviated as "SGW").

BACKGROUND ART

In a mobile network, a terminal needs to establish a connection to a packet data network (PDN) (hereinafter referred to as a "PDN connection") corresponding to a desired service in order to use the desired service (see Patent Document 1).

However, in the related art, a scheme in which, when a terminal (user equipment (UE)) in an idle state (IDLE state) having a plurality of PDN connections transitions to a connected state (left side in FIG. 6) as illustrated in FIG. 6, a plurality of bearers in a released state between the termi-nal-SGW, including bearers not used at that time, are established simultaneously is adopted. Further, a scheme in which, in a network in which one terminal accesses a plurality of SGWs, a plurality of bearers which are in a released state between one terminal and each SGW as illustrated in FIG. 7, including a bearer not used at that time, are established simultaneously is adopted.

CITATION LIST

Patent Literature

[Patent Literature 1] Japanese Patent Publication No. 2012-175575

SUMMARY OF INVENTION

Technical Problem

However, in the scheme of the related art, bearers that are not used are also established at the time of transition from an idle state to a connected state. Therefore, the scheme of the related art for simultaneously establishing a plurality of bearers including the unused bearers has room for improvement from the viewpoint of optimization of a system load when a maintenance cost of the unused bearers such as a system load caused by generation, transmission, and reception of a handover signal at the time of terminal movement is considered.

The present invention has been made in view of the above points, and an object of the present invention is to establish a bearer released at the time of idle state transition at an appropriate timing from the viewpoint of optimization of a system load.

Solution to Problem

A communication system according to one aspect of the present invention is a communication system including a terminal, a base station, a processing server that executes a process related to the terminal, and one or a plurality of serving gateways, wherein the processing server includes: a determination unit that determines whether or not an unused bearer other than a used bearer used for a service process is to be established on the basis of a system load for bearer maintenance and a system load for bearer establishment when the determination unit receives a service processing request from the terminal that is in an idle state; and a bearer establishment control unit that performs control so that the unused bearer determined to be established by the determination unit and the used bearer are established between a corresponding serving gateway and the terminal. It should be noted that the idle state (IDLE state) is a state in which communication is established but no communication processing is performed.

In the communication system as described above, the determination unit of the processing server determines whether or not the unused bearer other than the used bearer used for a service process is to be established on the basis of the system load for bearer maintenance and the system load for bearer establishment when the determination unit of the processing server receives a service processing request from the terminal that is in an idle state (including, for example, "when data is transmitted from the terminal" and "when a service processing request is received from the terminal responding to a paging signal (Paging) from a network triggered by reception of data addressed to the terminal), an unused bearer other than the used bearer used for the service processing to be established on the basis of the system load for bearer maintenance and the system load for bearer establishment, and the bearer establishment control unit of the processing server performs control so that the unused bearer determined to be established by the determination unit and the used bearer are established between a corresponding serving gateway and the terminal

Advantageous Effects of Invention

According to the present invention, it is possible to establish a bearer released at the time of idle state transition at an appropriate timing from the viewpoint of optimization of a system load.

BRIEF DESCRIPTION OF DRAWINGS

FIG. 5 is a flowchart showing a processing example according to an embodiment of the present invention.

FIG. 6 is a diagram illustrating a bearer establishment method of the related art.

FIG. 7 is a diagram illustrating a bearer establishment method of the related art in a network in which a terminal accesses a plurality of SGWs.

DESCRIPTION OF EMBODIMENTS

Figure 1:
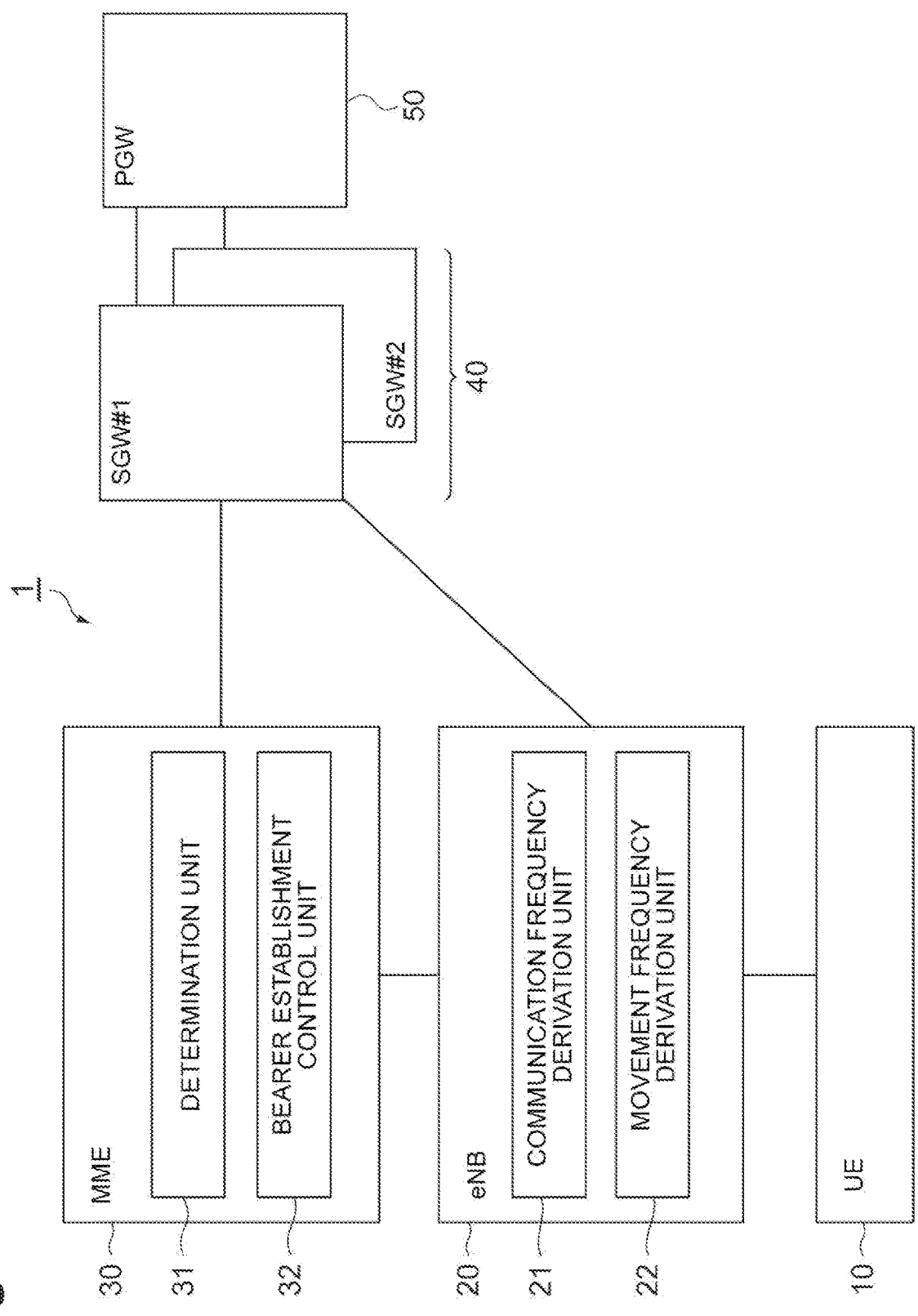
FIG. 1 is a diagram illustrating an example of a configuration of a communication system according to an embodiment of the present invention.

Hereinafter, embodiments of the present invention will be described in detail with reference to the drawings. In the description of the drawings, the same elements are denoted by the same reference numerals, and redundant descriptions are omitted.

(Description of Example of System Configuration)

As illustrated in FIG. 1, a communication system 1 according to an embodiment of the present invention includes a terminal (user equipment (hereinafter referred to as "UE" in the embodiment)) 10, an eNodeB (hereinafter referred to as "eNB" in the embodiment) 20 corresponding to a base station in an LTE network, an MME 30 that performs a process such as position management, authentication control, and communication path setting of the UE 10 located in the LIE network, a serving gateway (SGW) 40 to be described below, and a packet data network gateway (PGW) 50. A "processing server" according to the present invention corresponds to the MME 30.

The SGW 40 is a gateway device that functions as a serving packet switch that accommodates an LIE, and one or a plurality of SGWs 40 are provided in accordance with requirements of a communication service that is used by the UE 10. In the embodiment, an example in which the SGW 40 (here, SGW #1 and SGW #2) is provided in accordance with requirements of a plurality of communication services that are used by the UE 10 will be described by way of example.

The PGW 50 is a junction point with a packet data network (PDN), and is a gateway device that performs allocation of an IP address, transfer of packets to the SGW, and the like.

As a functional block related to the present invention, the MME 30 includes a determination unit 31 and a bearer establishment control unit 32. When the determination unit 31 receives the service processing request from the UE 10 that is in the idle state, the determination unit 31 determines whether or not an unused bearer other than a used bearer used for the service process is to be established on the basis of a system load for bearer maintenance and a system load for bearer establishment, in a procedure to be described below. The bearer establishment control unit 32 performs control so that an unused bearer determined to be established by the determination unit 31 and a used bearer are established between the corresponding SGW and the UE. The control scheme will be described below.

Further, as a functional block related to the present invention, the eNB 20 includes a communication frequency derivation unit 21 and a movement frequency derivation unit 22. The communication frequency derivation unit 21 measures the number communications of the UE 10 to derive the communication frequency of the UE 10, and notifies the determination unit 31 of the MME 30 of the obtained communication frequency. The movement frequency derivation unit 22 derives the movement frequency between the cells of the UE 10 from a terminal movement cell list (Last Visited Cell List) to be described, which is managed by the eNB 20, and notifies the determination unit 31 of the MME 30 of the obtained movement frequency between cells of the UE 10. A scheme of deriving the communication frequency and the movement frequency will be described below.

Figure 2:
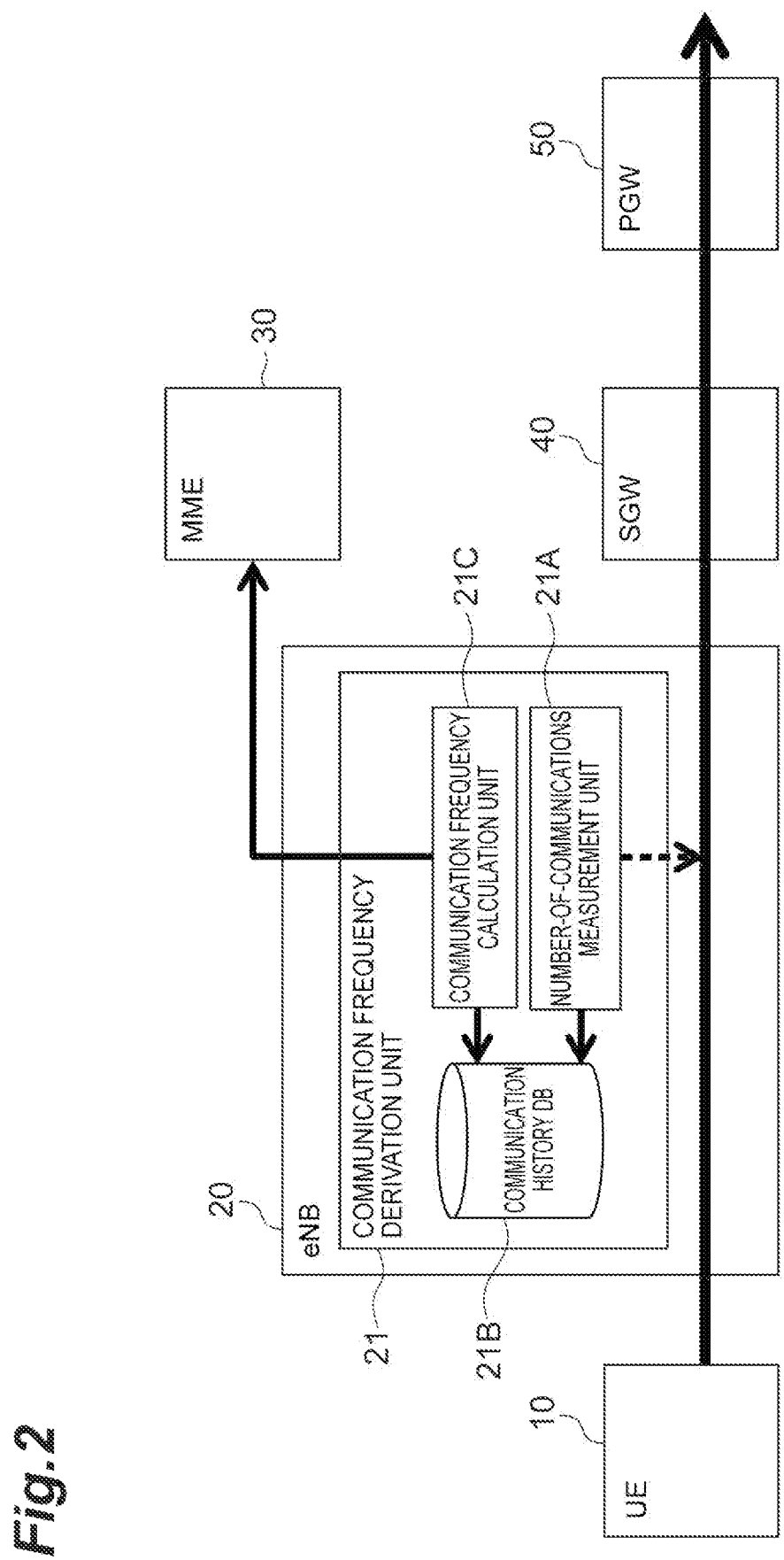
FIG. 2 is a diagram illustrating an example of a configuration of a communication frequency derivation unit.

FIG. 2 illustrates an example of a configuration of the communication frequency derivation unit 21. As illustrated in FIG. 2, the communication frequency derivation unit 21 includes a number-of-communications measurement unit 21A that measures the number of communications of the UE 10, a communication history DB 21B that cumulatively stores information on the number of communications obtained through measurement, and a communication frequency calculation unit 21C that calculates a communication frequency (for example, a communication occurrence rate $\lambda_c$ to be described below) of the UE 10 from the information on the number of communications of the UE 10 in a predetermined past period (for example, a past period of one month or a past period of one week) by referring to the communication history DB 21B and notifies the determination unit 31 of the MIME 30 of the communication frequency. It should be noted that for a method and a timing of notification to the determination unit 31, for example, the notification may be performed at the time of bearer reestablishment in a method of notifying of the obtained communication frequency by including the communication frequency in a service request message, the notification may be performed at regular time intervals in a method of notifying of the obtained communication frequency by including the communication frequency in a new message, or other notification methods and notification timings may be adopted.

Figure 3:
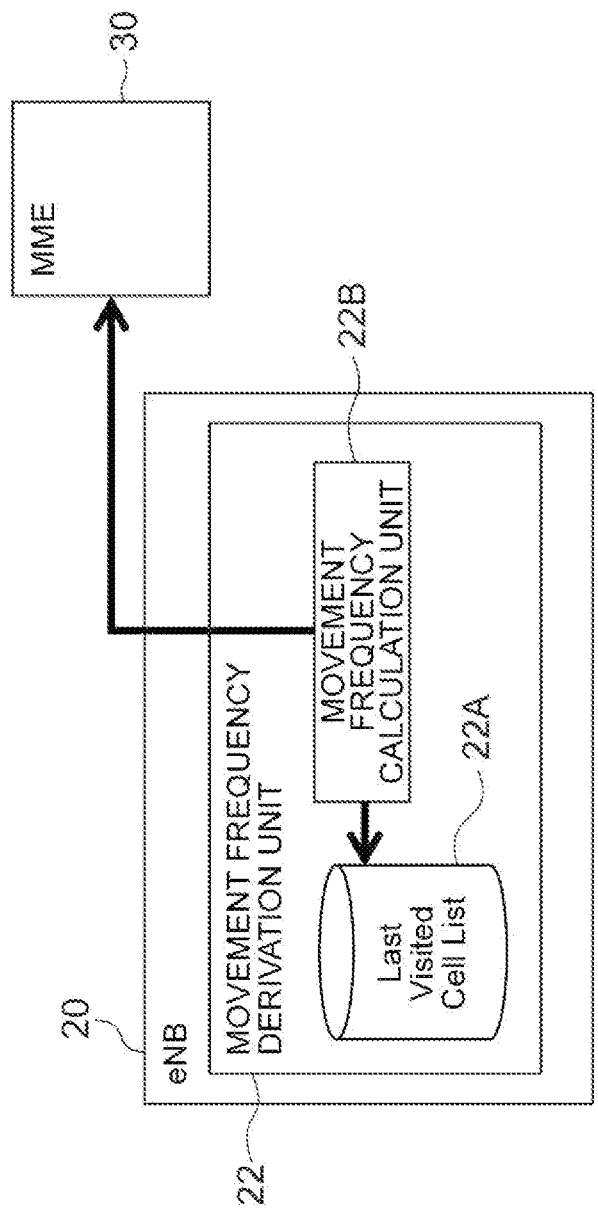
FIG. 3 is a diagram illustrating an example of a configuration of a movement frequency derivation unit.

FIG. 3 illustrates an example of a configuration of the movement frequency derivation unit 22. As illustrated in FIG. 3, the movement frequency derivation unit 22 includes a terminal movement cell list (last visited cell list) 22A that is managed by the eNB 20, and a movement frequency calculation unit 22B that derives a movement frequency (for example, a handover occurrence rate to be described below) between cells of the UE 10 from the terminal movement cell list 22A and notifies the determination unit 31 of the MIME 30 of the movement frequency. In the terminal movement cell list 22A among them, a cell ID (Global Cell ID), a cell type (Cell type), and a cell stay time (Time UE stayed in cell) for each UE are stored in association with each other. The movement frequency calculation unit 22B may derive the movement frequency between the cells that is inversely correlated with the cell stay time by referring to information on the cell stay time. For example, the movement frequency calculation unit 22B may obtain an average value of cell stay times within a predetermined period for a certain UE, and derive a reciprocal of a value obtained by dividing the average value of the cell stay time by a length of the predetermined period (an average number of movements between cells within the predetermined period) as the movement frequency between cells. Further, the movement frequency calculation unit 22B may obtain the number of movements between cells within the predetermined period for a certain UE from the terminal movement cell list 22A, and take the number of movements between cells as the movement frequency between cells. It should be noted that for a method and a timing of notification to the determination unit 31, for example, the notification may be performed at the time of bearer reestablishment in a method of notifying of the obtained movement frequency by including the movement frequency in a service request message, the notification may be performed at regular time intervals in a method of notifying of the obtained movement frequency by including the movement frequency in a new message, or other notification methods and notification timings may be adopted.

For unused bearers, the determination unit 31 of the MME 30 described above derives a system load for bearer establishment on the basis of the communication frequency of the UE 10 notified of by the communication frequency derivation unit 21 and the number of connection request signals related to the bearer establishment that can be ascertained by the MME 30, and derives the system load for bearer maintenance on the basis of the movement frequency between the cells of the UE 10 notified of by the movement frequency derivation unit 22 and the number of handover signals that can be ascertained by the MME 30. The determination unit 31 compares the derived system load for bearer establishment with the system load for bearer maintenance, and determines whether or not the unused bearers are to be established on the basis of a result of the comparison. Hereinafter, an example of a specific scheme will be described.

The determination unit 31 obtains a "bearer establishment cost a" from the number of signals of the connection request signal and obtains a "handover cost b" from the number of handover signals. Here, for example, the determination unit 31 may obtain the number of signals of the connection request signal as the "bearer establishment cost a" or may obtain a value obtained by multiplying the number of connection request signals by a predetermined coefficient as the "bearer establishment cost a". A scheme other than these may be used. Similarly, the determination unit 31 may obtain the number of handover signals as the "handover cost b", or may obtain a value obtained by multiplying the number of handover signals by a predetermined coefficient as the "handover cost b". A scheme other than these may be used. The determination unit 31 obtains the product $a\lambda_c$ of the communication frequency (for example, the communication occurrence rate $\lambda_c$) of the UE 10 notified of by the communication frequency derivation unit 21 and the "bearer establishment cost a", and obtains a product $a\lambda_m$ of the movement frequency (for example, the handover occurrence rate $\lambda_m$) between cells of the UE 10 notified of by the movement frequency derivation unit 22 and the "handover cost b". For a certain unused bearer, the determination unit 31 determines that the unused bearer is to be established when $a\lambda_c > b\lambda_m$ is satisfied, and determines that the unused bearer is not to be established when $a\lambda_c < b\lambda_m$ is satisfied. It should be noted that, when $a\lambda_c = b\lambda_m$ is satisfied, it is determined that the unused bearer is to be established, but this is not an essential requirement. When $a\lambda_c = b\lambda_m$ is satisfied, it may be determined that the unused bearer is not to be established.

It should be noted that, although not illustrated in the configuration diagram of FIG. 1, each of the UE 10 and the MME 30 has a bearer establishment request function for requesting bearer establishment, and each of the UE 10, the eNB 20, and the SGW 40 has a bearer establishment request function for establishing a bearer. Further, the SGW 40 has a buffering function for buffering data (for example, downlink data addressed to the UE 10 from the PGW 50), and a data reception notification function for notifying the MME 30 of data reception when data (for example, downlink data addressed to the UE 10 from the PGW 50) has been received.

Figure 4:
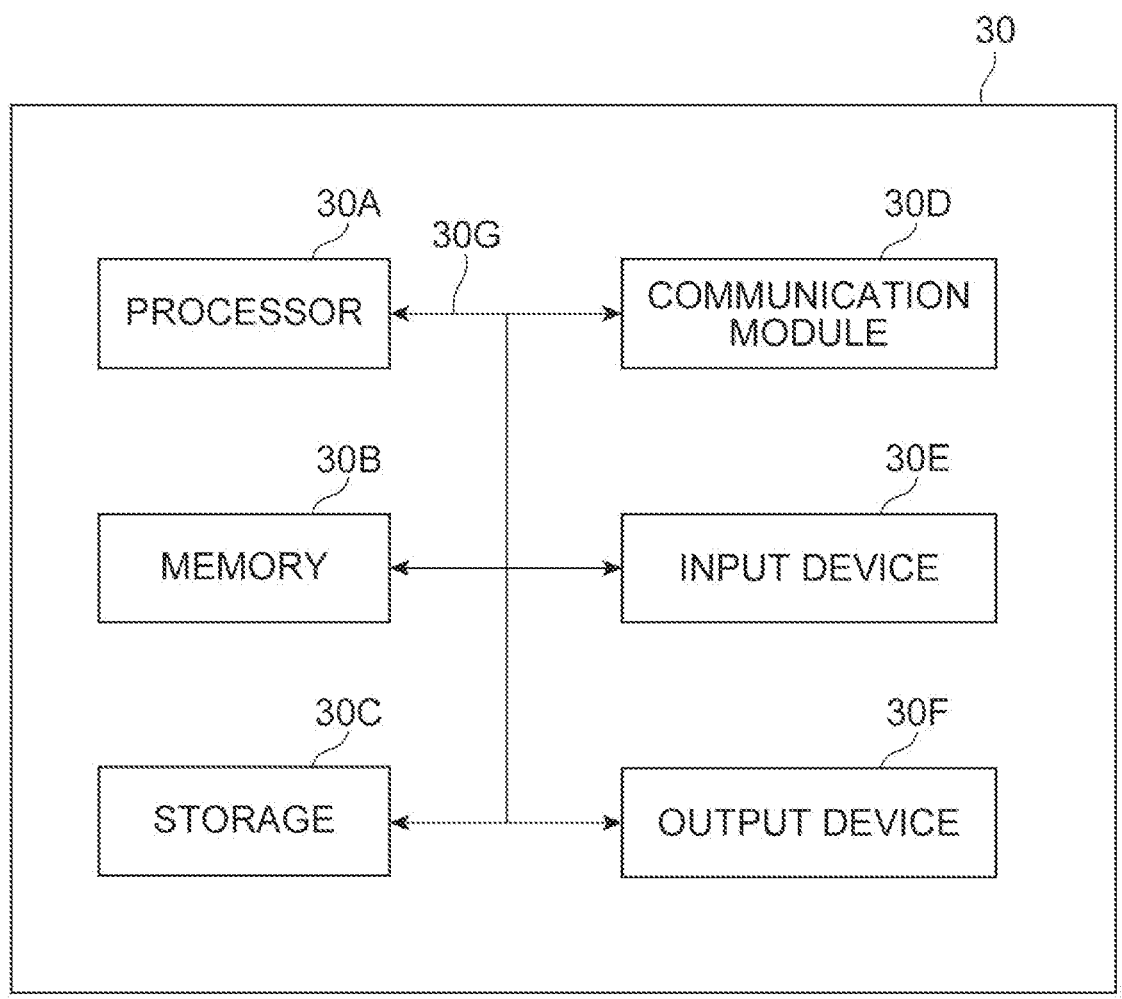
FIG. 4 is a diagram illustrating an example of a hardware configuration of each device.

Here, an example of a hardware configuration of the MME 30 corresponding to the "processing server" of the present invention will be described with reference to FIG. 4. A functional block (constituent unit) of the MIME 30 is realized by any combination of hardware and/or software. Further, means for realizing each functional block is not particularly limited. That is, each functional block may be realized by one physically and/or logically coupled device or may be realized by a plurality of devices in which two or more physically and/or logically separated devices are connected directly and/or indirectly (for example, by a cable and/or wirelessly). It should be noted that an example of a hardware configuration to be described below is not limited to the MME 30, and may be adopted in the PGW 50, the SGW 40, the eNB 20, and the UE 10 illustrated in FIG. 1.

For example, the MME 30 according to an embodiment of the present invention may function as a computer that performs bearer establishment control according to the present invention. FIG. 4 is a diagram illustrating an example of a hardware configuration of the MIME 30 according to an embodiment of the present invention. The MME 30 described above may be physically configured as a computer device including a processor 30A, a memory 30B, a storage 30C, a communication module 30D, an input device 30E, an output device 30F, a bus 30G and the like.

It should be noted that, in the following description, the term "device" can be interpreted as a circuit, a device, a unit, or the like. The hardware configuration of the MME 30 may be configured to include one or a plurality of devices illustrated in FIG. 4 or may be configured not to include some of the devices.

Each function in the MME 30 is realized by loading predetermined software (programs) into hardware such as the processor 30A or the memory 30B, so that the processor 30A performs computation to control communication using the communication module 30D, and reading and/or writing of data in the memory 30B and the storage 30C.

The processor 30A, for example, operates an operating system to control the entire computer. The processor 30A may be configured of a central processing unit (CPU) including an interface with a peripheral device, a control device, a computing device, a register, and the like. For example, the determination unit 31 and the bearer establishment control unit 32 described above may be realized by the processor 30A.

Further, the processor 30A reads a program (program code), a software module, and data from the storage 30C and/or the communication module 30D to the memory 30B, and executes various processes according to the program, the software module, and the data. As the program, a program for causing the computer to execute at least part of the operation described in the above embodiment may be used. For example, the determination unit 31, the bearer establishment control unit 32, and the like may be realized by a control program stored in the memory 30B and operating on the processor 30A or other functional blocks may be realized similarly. Although the case in which the various processes described above are executed by one processor 30A has been described, the processes may be executed simultaneously or sequentially by two or more processors 30A. It should be noted that the processor 30A may be implemented by one or more chips. It should be noted that the program may be transmitted from the network via an electric communication line.

The memory 30B is a computer-readable recording medium, and may be configured of, for example, at least one of a read only memory (ROM), an erasable programmable ROM (EPROM), an electrically erasable programmable ROM (EEPROM), and a random access memory (RAM). The memory 30B may be referred to as a register, a cache, a main memory (a main storage device), or the like. The memory 30B can store an executable program (program code), software modules, and the like in order to implement a wireless communication method according to the embodiment of the present invention.

The storage 30C is a computer-readable recording medium, and may be configured of, for example, at least one of an optical disc such as a compact disc ROM (CD-ROM), a hard disk drive, a flexible disk, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 30C may be referred to as an auxiliary storage device. The storage medium described above may be, for example, a database including the memory 30B and/or the storage 30C, a server, or another appropriate medium.

The communication module 30D is hardware (a transmission and reception device) for performing communication between computers via a wired and/or wireless network, and is also referred to as, for example, a network device, a network controller, or a network card.

The input device 30E is an input device that receives an input from the outside. The output device 30F is an output device (for example, a display, a speaker, or an LED lamp) that performs output to the outside. It should be noted that the input device 30E and the output device 30F may be integrated (for example, a touch panel).

Further, the respective devices such as the processor 30A and the memory 30B are connected by the bus 30G for communicating information. The bus 30G may be configured of a single bus or may be configured of different buses between the devices.

Further, the MME 30 may be configured to include hardware such as a microprocessor, a digital signal processor (DSP), an application specific integrated circuit (ASIC), a programmable logic device (PLD), or a field programmable gate array (FPGA), and part or all of each functional block may be realized by hardware. For example, the processor 30A may be realized using at least one piece of hardware.

(Processing Content in Embodiment of Invention)

Hereinafter, processing content relating to the bearer establishment control in the embodiment will be described with reference to FIG. 5. Processes of steps S1 to S28 in a flow diagram of FIG. 5 correspond to a process at the time of reception of data that is triggered by reception of data addressed to the UE 10, and processes of steps S6 to S28 also correspond to a process at the time of data transmission from the UE 10.

First, a process at the time of data reception triggered by reception of data addressed to the UE 10 will be described. When data in a downlink direction addressed to the UE 10 is transferred from the PGW 50 to the SGW #1 (step S1), the SGW #1 notifies, through a downlink data notification, the MME 30 of the reception of the data in the downlink direction addressed to the UE 10 through the data reception notification function of the SGW #1 (step S2). The MIME 30 that has received the notification replies to the SGW #1 with a positive acknowledgment (downlink data notification ack) (step S3), specifies the eNB 20 accommodating the UE 10 that is a data transmission destination, for example, by referring to terminal accommodation management information managed by the MME 30, and transmits a paging signal to the UE 10 via the eNB 20 (steps S4 and S5).

The UE 10 that has received the paging signal transmits a service request for requesting a service for processing data to the eNB 20 (step S6), and the eNB 20 transfers the service request to the MIME 30 (step S7). In this case, the eNB 20 calculates the communication frequency (for example, the communication occurrence rate kJ of the UE 10 from the information on the number of communications of the UE 10 in the predetermined past period accumulated in the communication history DB 21B using the communication frequency derivation unit 21, derives the movement frequency (for example, the handover occurrence rate $\lambda_m$) between the cells of the UE 10 from the terminal movement cell list 22A using the movement frequency derivation unit 22, includes information on the obtained communication frequency and the obtained movement frequency of the UE 10 in the service request, and transfers the service request to the MIME 30.

The MIME 30 receives the service request including the information on the communication frequency and the movement frequency of the UE 10, and the determination unit 31 performs the following determination process related to bearer establishment (step S8). That is, the determination unit 31 obtains the "bearer establishment cost a" from the number of signals of the connection request signal and obtains the "handover cost b" from the number of handover signals. The determination unit 31 obtains the product $a\lambda_c$ of the communication frequency (for example, the communication occurrence rate $\lambda_c$) of the UE 10 notified of by the communication frequency derivation unit 21 and the "bearer establishment cost a", and obtains the product $b\lambda_m$ of the movement frequency (for example, the handover occurrence rate $\lambda_m$) between cells of the UE 10 notified of by the movement frequency derivation unit 22 and the "handover cost b". Further, for a certain unused bearer, the determination unit 31 determines that the unused bearer is to be established when $a\lambda_c > b\lambda_m$ is satisfied, and determines that the unused bearer is not to be established when $a\lambda_c < b\lambda_m$ is satisfied. It should be noted that when $a\lambda_c = b\lambda_m$ is satisfied, the determination unit 31 may determine that the unused bearer is to be established. However, this is not an essential requirement, and when $a\lambda_c = b\lambda_m$ is satisfied, the determination unit 31 determines that the unused bearer is not to be established. Thus, in step S8, the unused bearer determined to be established at that point in time among unused bearers is determined, in addition to the used bearer to be used for the service. That is, the used bearers and the unused bearers determined to be established at the point in time are determined as "bearers to be established."

The MME 30 performs a predetermined authentication process with each of the PGW 50 and the UE 10 (step S9). Thereafter, when the MME 30 transmits an initial context setup request to the eNB 20 (step S10), the eNB 20 establishes a radio bearer with the UE 10 (step S11). Accordingly, since a communication link between the UE 10 and the SGW #1 is established via the eNB 20, uplink data is transferred from the UE 10 to the SGW #1 via the eNB 20 (steps S12 and S13), and is also transferred from the SGW #1 to the PGW 50 (step S14).

Thereafter, when the eNB 20 responds to the MME 30 with initial context setup complete (step S15), the MIME 30 transmits a modify bearer request to the PGW 50 via the SGW #1 in order to correct the bearer information to a "bearer to be established" determined in step S8 (steps S16 and S17). When the bearer information is normally corrected to be "bearer to be established" in the PGW 50, the PGW 50 responds to the MIME 30 with a modify bearer response indicating that the bearer has been normally corrected via the SGW #1 (steps S18 and S19). Accordingly, the "bearer to be established" between the UE 10 and the PGW 50 is reestablished via the SGW #1.

The SGW #1 receives the fact that the used bearer has been reestablished in step S1 and transfers the downlink data buffered in the SGW #1 to the UE 10 via the eNB 20 (steps S20 and S21).

Here, when it is assumed that a bearer passing through SGW #2 is included in the "bearer to be established" determined in step S8, the processes of step S22 and subsequent steps are executed. That is, when the MME 30 transmits an initial context setup request to the eNB 20 (step S22), the eNB 20 establishes a radio bearer with the UE 10 (step S23) and replies to the MME 30 with an initial context setup complete (step S24). Thereafter, the MME 30 transmits a modify bearer request to the PGW 50 via the SGW #2 to modify the bearer information to the "bearer to be established" determined in step S8 (steps S25 and S26). When the bearer information is normally corrected to the "bearer to be established" in the PGW 50, the PGW 50 replies to the MIME 30 with a modify bearer response indicating that the bearer has been normally corrected, via the SGW #2 (steps S27 and S28). Accordingly, the "bearer to be established" between the UE 10 and the PGW 50 is reestablished via the SGW #2.

The above is a "process at the time of data reception in the UE 10 (steps S1 to S28)". The "process at the time of data transmission from the UE 10" corresponds to a process that is executed after the UE 10 has received a paging signal and corresponds to the processes of steps S6 to S28 described above. Since the processes of steps S6 to S28 have already been described, duplicate description will be omitted herein.

Operation and Effects According to Embodiment of Invention

As described above, in the communication system 1, when the determination unit 31 of the MME 30 receives the service processing request from the UE 10 that is in the idle state (that is, at the time of reception of an autonomous service processing request from the UE 10 and at the time of reception of the service processing request from the UE 10 that has been in response to the paging signal (Paging) from the network triggered by reception of data addressed to the UE 10), the determination unit 31 of the MIME 30 determines whether or not an unused bearer other than a used bearer used for the service process is to be established on the basis of the system load for bearer maintenance and the system load for bearer establishment, and the bearer establishment control unit 32 of the MME 30 performs control so that the unused bearer determined to be established and the used bearer are established between the SGW 40 and the UE 10. Accordingly, it is possible to establish the bearer released at the time of idle state transition at an appropriate timing from the viewpoint of optimization of a system load.

The determination unit 31 compares the system load for bearer maintenance with the system load for bearer establishment for the unused bearer, determines that an unused bearer in which the system load for bearer maintenance is greater than the system load for bearer establishment is not be established, and determines that an unused bearer in which the system load for bearer maintenance is smaller than the system load for bearer establishment is to be established. Accordingly, it is possible to establish the bearer released at the time of idle state transition at a more appropriate timing in consideration of not only the system load for bearer establishment but also the system load for bearer maintenance.

More specifically, the determination unit 31 derives a product $a\lambda_c$ of the communication frequency (for example, the communication occurrence rate $\lambda_c$) of the UE 10 notified of by the communication frequency derivation unit 21 of the eNB 20 and the "bearer establishment cost a" based on the number of connection request signals related to the bearer establishment, as the system load for bearer establishment, and derives a product $a\lambda_m$ of the movement frequency (for example, the handover occurrence rate $\lambda_m$) between cells of the UE 10 notified of by the movement frequency derivation unit 22 of the eNB 20 and the "handover cost b" based on the number of handover signals, as the system load for bearer maintenance. The determination unit 31 compares the derived system load for bearer establishment with the system load for bearer maintenance and determines whether or not the bearer is to be established on the basis of a result of the comparison. Thus, it is determined whether or not the bearer is to be established on the basis of the result of the comparison between the "system load for bearer establishment (the product $a\lambda_c$)" and the "system load for bearer maintenance (the product $b\lambda_m$) derived using the actual communication frequency and the actual movement frequency of the UE 10. Therefore, it is possible to establish the bearer released at the time of idle state transition at a more appropriate timing.

It should be noted that the example in which the MIME 30 includes the "determination unit 31" and the "bearer establishment control unit 32" according to the present invention has been described in the above embodiment, but the present invention is not limited thereto, and a configuration in which one or both of the "determination unit 31" and the "bearer establishment control unit 32" are provided outside the MME 30 may be adopted.

Although the embodiment has been described above in detail, it will be obvious to those skilled in the art that the embodiment is not limited to the embodiments described in the present specification. The embodiment can be implemented as variation and modification aspects without departing from the spirit and scope of the present invention as defined by the claims. Therefore, the description of the present specification is intended for illustration and does not have any restrictive meaning with respect to the embodiment.

The notification of information is not limited to the aspects/embodiments described in the present specification, but may be performed in other ways. For example, the notification of information may be performed by physical layer signaling (for example, downlink control information (DCI) or uplink control information (UCI)), upper layer signaling (for example, radio resource control (RRC) signaling, medium access control (MAC) signaling, reporting information (a master information block (MIB)) or a system information block (SIB)), other signals, or a combination thereof. Further, the RRC signaling may be referred to as an RRC message and may be, for example, an RRC connection setup message or an RRC connection reconfiguration message.

Each aspect/embodiment described in the present specification can be applied to a system that uses long term evolution (LTE), LTE-Advanced (LIE-A), SUPER 3G, IMT-Advanced, 4G, 5G, future radio access (FRA), W-CDMA (registered trademark), GSM (registered trademark), CDMA 2000, ultra mobile broadband (UMB), IEEE 802.11 (Wi-Fi), IEEE 802.16 (WiMAX), IEEE 802.20, Ultra-Wide Band (UWB), Bluetooth (registered trademark), or another appropriate system, and/or a next-generation system expanded based on these.

Further, an order of a processing procedure, sequence, flowchart, and the like of each aspect/embodiment described in the present specification may be changed as long as there is no contradiction. For example, in the method described in the present specification, elements of the various steps are presented in an exemplary order and are not limited to the presented specific order.

Information or the like can be output from an upper layer (or a lower layer) to the lower layer (or the upper layer). The information or the like may be input or output via a plurality of network nodes.

Input or output information or the like may be stored in a specific place (for example, a memory) or managed in a management table. Information or the like to be input or output can be overwritten, updated, or additionally written. Output information or the like may be deleted. Input information or the like may be transmitted to another device.

Determination may be performed by a value (0 or 1) represented by one bit, may be performed by a boolean value (true or false), or may be performed through a numerical value comparison (for example, comparison with a predetermined value).

Each aspect or embodiment described in the present specification may be used singly, may be used in combination, or may be switched according to execution and used. Further, a notification of predetermined information (for example, a notification of "being X") is not limited to being performed explicitly, and may be performed implicitly (for example, not by notifying the predetermined information).

The software is referred to as software, firmware, middleware, microcode, or hardware description language, and can be construed widely to mean instructions, an instruction set, codes, code segments, program codes, a program, a subprogram, a software module, an application, a software application, a software package, a routine, a subroutine, an object, an executable file, an execution thread, a procedure, a function, or the like even though the software is referred to as another name.

Further, software, instructions, and the like may be transmitted and received via a transmission medium. For example, when the software may be transmitted from a website, a server, or another remote source using wired technology such as a coaxial cable, a fiber optic cable, a twisted pair, or a digital subscriber line (DSL) and/or wireless technology such as infrared rays, wireless technology, or microwaves, these wired and/or wireless technologies are included within a definition of the transmission medium.

The information, signals, and the like described in the present specification may be represented using any of a variety of different technologies. For example, data, instruction, command, information, signal, bit, symbol, chip, and the like that can be mentioned throughout the above description may be represented by voltage, current, electromagnetic waves, magnetic field or magnetic particles, or optical field or photons, or any combination thereof.

It should be noted that the terms described in the present specification and/or terms necessary for understanding of the present specification may be replaced by terms having the same or similar meanings.

The terms "system" and "network" used in the present specification are used interchangeably.

Further, the information, parameters, and the like described in the present specification may be represented as absolute values, may be represented as relative values from predetermined values, or may be represented by other corresponding information. For example, wireless resource may be indicated by an index.

Names used for the above-described parameters are not limited at any point. Further, mathematical expressions or the like using these parameters may be different from those explicitly disclosed in the present specification. Since various channels (for example, PUCCH and PDCCH) and information elements (for example, TPC) can be identified by any suitable name, various names assigned to the various channels and information elements are not limited at any point.

A base station (eNB) in the embodiment can accommodate one or a plurality of cells (also referred to as sectors). In a case in which the base station accommodates a plurality of cells, an entire coverage area of the base station can be divided into a plurality of smaller areas, and each smaller area can provide a communication service using a base station subsystem (for example, a small base station for indoor use, remote radio head (RRH). The term "cell" or "sector" refers to a part or all of a coverage area of a base station and/or base station subsystem that performs a communication service in a coverage of the cell or sector. Further, the terms "base station", "eNB", "cell", and "sector" can be used interchangeably in the present specification. The base station may also be referred to as a term such as a fixed station, Node B, eNode B (eNB), an access point, a femtocell, or a small cell.

The terminal (UE) may be called a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms by a person of ordinary skill in the art.

The terms "determining" used in the present specification may include a wide variety of operations. "Determining" may include, for example, considering judging, calculating, computing, processing, deriving, investigating, looking up (for example, looking up in a table, a database or another data structure), and "ascertaining" as "determining". Further, the "determining" may include, for example, considering receiving (for example, receiving information), transmitting (for example, transmitting information), input, output, and accessing (for example, accessing data in a memory) as "determining". Further, "determining" may include, for example, considering resolving, selecting, choosing, establishing, and comparing as "determining". That is, "determining" may include considering some operations as "determining".

The terms "connected", "coupled", or any modification thereof means any direct or indirect connection or coupling between two or more elements, and can include the presence of one or more intermediate elements between two elements "connected" or "coupled" to each other. The coupling or connection between the elements may be physical, may be logical, or may be a combination thereof. In the present specification, two elements can be considered to be "connected" or "coupled" to each other by using one or more wires, cables, and/or printed electrical connections, or by using electromagnetic energy such as electromagnetic energy having wavelengths in a radio frequency region, a microwave region, and a light (both visible and invisible) region as some non-limiting and non-comprehensive examples.

Further, description "on the basis of" used in the present specification does not mean "on the basis of only" unless explicitly stated otherwise. In other words, the description "on the basis of" means both "on the basis of only" and "on the basis of at least".

When terms such as "first", "second", and the like in the present specification have been used, any reference to elements thereof does not generally limit an amount or order of the elements. These twins can be used in the present specification as a convenient way to distinguish between two or more elements. Thus, the reference to the first and second elements does not mean that only two elements can be adopted there or that the first element has to precede the second element in some way.

"Including", "comprising", and modifications thereof are intended to be comprehensive like the term "comprising" as long as these are used in the present specification or claims. Further, the term "or" used in the present specification or claims is intended not to be exclusive disjunction.

In the present specification, it is assumed that a plurality of devices are also included in cases other than a case in which there is obviously only one device in the context or technically.

REFERENCE SIGNS LIST

1: Communication system, 10: UE (terminal), 20: ENB (base station), 21: Communication frequency derivation unit, 21A: number-of-communications measurement unit, 21B: Communication history DB, 21C: Communication frequency calculation unit, 22: Movement Frequency derivation unit, 22A: Terminal movement cell list, 22B: Movement frequency calculation unit, 30: MIME (processing server), 30A: Processor, 30B: Memory, 30C: Storage, 30D: Communication module, 30E: Input device, 30F: Output device, 30G: Bus, 31: Determination unit, 32: Bearer establishment control unit, 40: SGW, 50: PGW.

The invention claimed is:

1. A communication system including a terminal, a base station, a processing server that executes a process related to the terminal, and one or a plurality of serving gateways, wherein the processing server comprises:
   a circuitry configured to:
   determine an unused bearer from a plurality of unused bearers other than a used bearer used for a service process to be established at that point in time when a request of the service process is received from the terminal that is in an idle state; and
   perform control so that the determined unused bearer and the used bearer are established between a corresponding serving gateway and the terminal.

2. A processing server that is provided in a communication system including a terminal, a base station, and one or a plurality of serving gateways and executes a process related to the terminal, the processing server comprising:
   a circuitry configured to:
   determine an unused bearer from a plurality of unused bearers other than a used bearer used for a service process to be established at that point in time when a request of the service process is received from the terminal that is in an idle state; and
   perform control so that the determined unused bearer and the used bearer are established between a corresponding serving gateway and the terminal.

3. A bearer establishment control method that is executed in a communication system including a terminal, a base station, a processing server that executes a process related to the terminal, and one or a plurality of serving gateways, the bearer establishment control method comprising:
   determining, by the processing server, an unused bearer from a plurality of unused bearers other than a used bearer used for a service process to be established at that point in time when the processing server receives a request of the service process from the terminal that is in an idle state; and
   performing, by the processing server control so that the determined unused bearer and the used bearer are established between a corresponding serving gateway and the terminal.

* * * * *